Figure 7:
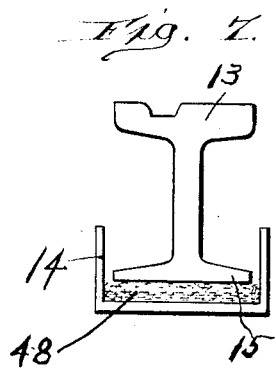

C. F. JACOBS.
PROCESS FOR UNITING RAILS AND OTHER METAL PIECES.
APPLICATION FILED OCT. 11, 1907.
933,457.
Patented Sept. 7, 1909.
2 SHEETS—SHEET 1.
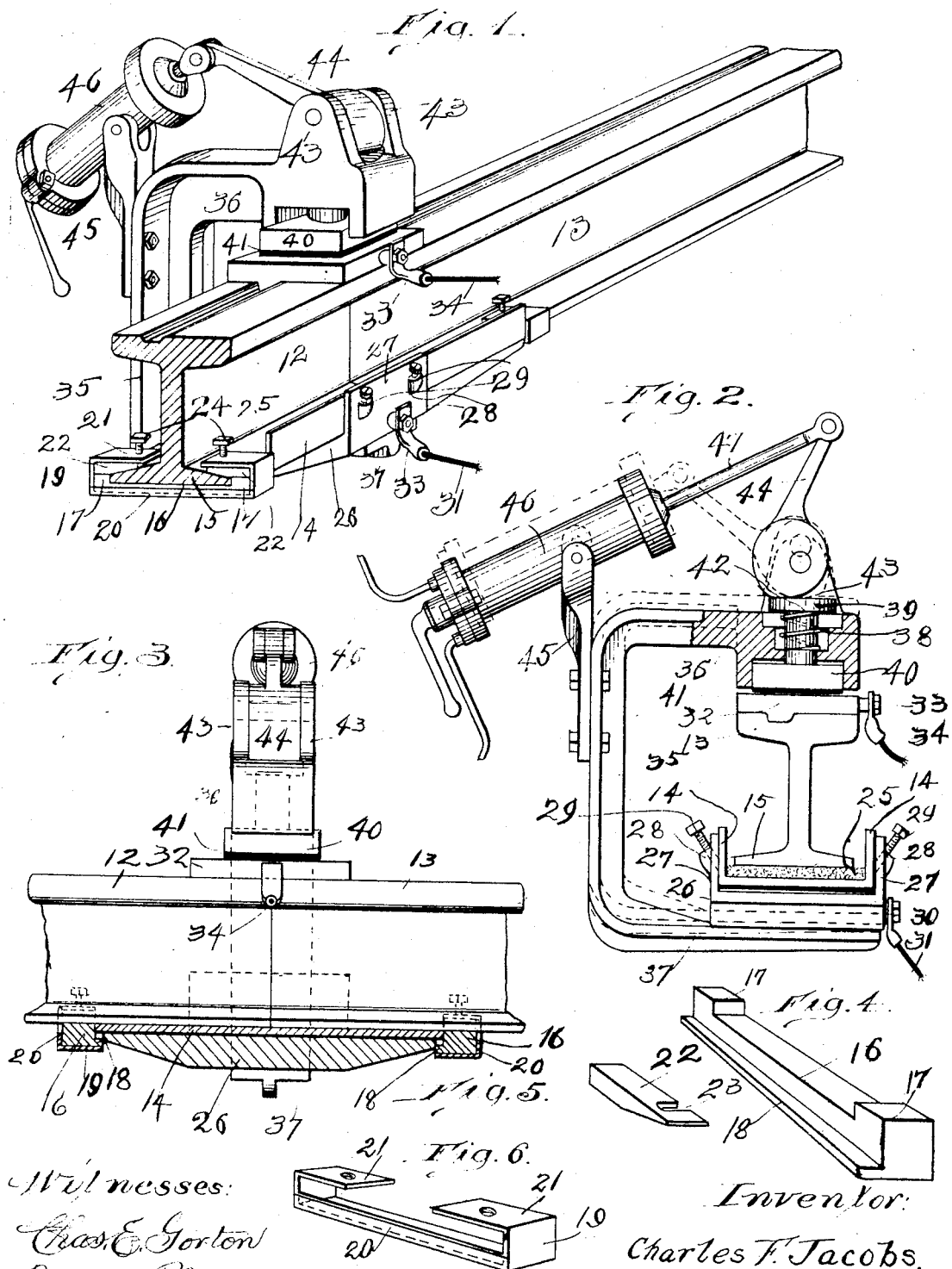
Witnesses:
Chas. E. Gorton
M. A. Nyman
Inventor:
Charles F. Jacobs.
By 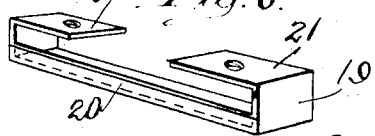 Atty.

C. F. JACOBS.
PROCESS FOR UNITING RAILS AND OTHER METAL PIECES.
APPLICATION FILED OCT. 11, 1907.

933,457.

Patented Sept. 7, 1909.
2 SHEETS—SHEET 2.

Witnesses:
Chas. E. Gorton.
M. A. Nyman.

Inventor:
Charles F. Jacobs.
By Chas. D. Allman Atty.

UNITED STATES PATENT OFFICE.

CHARLES F. JACOBS, OF CHICAGO, ILLINOIS, ASSIGNOR TO JACOBS WELDING COMPANY, OF CHICAGO, ILLINOIS, A CORPORATION OF ILLINOIS.

PROCESS FOR UNITING RAILS AND OTHER METAL PIECES.

933,457.   Specification of Letters Patent.   Patented Sept. 7, 1909.

Application filed October 11, 1907. Serial No. 397,005.

*To all whom it may concern:*

Be it known that I, CHARLES F. JACOBS, a citizen of the United States, residing at Chicago, in the county of Cook and State of Illinois, have invented certain new and useful Improvements in Processes for Uniting Rails and other Metal Pieces, of which the following is a specification.

This invention has relation to the art of electrically uniting or welding metallic pieces, and the objects thereof are substantially the same as those set forth in my application for Letters-Patent for improvements in a process for welding and bonding rails and other metal pieces, filed June 28th, 1907, Serial No. 381,229, namely, to provide a simple, efficient and economical method or process for uniting, welding or bonding metallic pieces, by the use of which, when employed for track or railway rails, a continuous rail with perfect and permanent electric conductivity will be afforded at a great saving of time, labor, material and expense.

While the present invention is more especially intended for use in joining the rails of electric railways so as to render them practically continuous and adaptable for the transmission of electric currents, yet it is applicable for uniting rails or metallic pieces employed for various other purposes, and it consists in certain novel features, acts, procedure and steps practiced in carrying out the process, and it will be understood that any suitable apparatus may be employed for receiving the material used in the operation, and for practicing or carrying out the different steps of the process, and in the accompanying drawings I have shown one form of such devices, but I do not wish to be limited thereto, as they may be varied or other devices may be employed therefor, but to facilitate the explanation of the process so that it may be more easily and thoroughly understood, it is deemed necessary to illustrate one form thereof.

By my present process the operation of uniting the metallic pieces or rails is effected in substantially a different manner and by means of devices which are different in construction and operation from the process disclosed in my aforesaid application, and from the appliances used in carrying out the same. For, in said application the splice bars or bonding pieces are united to the webs of the abutting rails or sides of the metallic pieces, and are incased in molds which must necessarily be broken in the operation of forcing the bond pieces or splice bars into contact with the rails, whereas in my present process the splice bars or bonding pieces are united to the bottom of the bases of the rails, and the incasing mold for the said bars or pieces are omitted, thus allowing the bars or pieces to be forced into contact with the rails or other metal pieces to be joined without the necessity of crushing the molds.

Various other important and novel steps of my present invention will be disclosed in the subjoined description and explanation.

Figure 8:
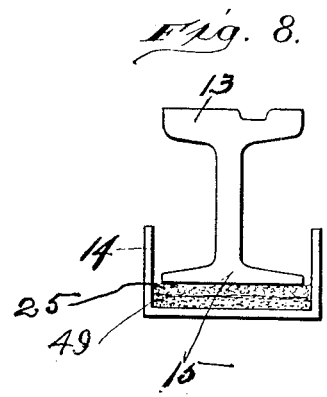
Figure 9:
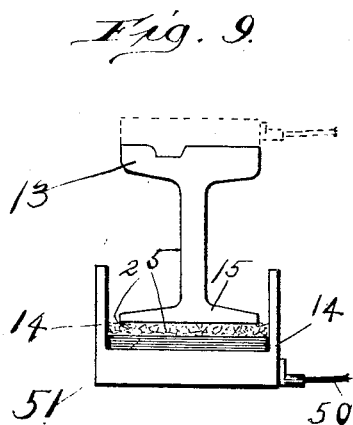
Figure 10:
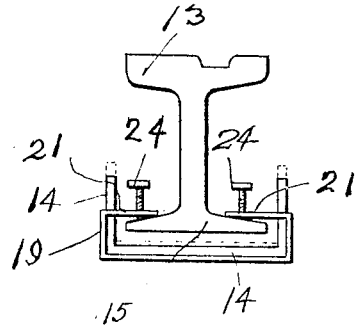

In the accompanying drawings, which serve to illustrate the invention—Figure 1 is a perspective view of a portion of two abutting railway rails, showing appliances in position thereon for the practicing of my process, and illustrating the parts in the positions they will occupy when the process of uniting the rails shall have been completed. Fig. 2 is a view in elevation and partly in section of one end of one of the rails, showing the splice bar or bonding piece in position for beginning the process of uniting the rails, and illustrating a clamping device or compressor in position on the rail to be used for forcing the splice bar or bonding piece into contact with the bases of the rails. Fig. 3 is a side view partly in elevation and partly in section of a portion of the abutting or approximated ends of two rails, illustrating the means for forcing the bonding piece or splice bar into contact therewith. Fig. 4 is a detached perspective view of one of the weirs used at the ends of the splice bar or bonding piece to assist in forming a holder for suitable flux. Fig. 5 is a similar view of a detachable part or plug used in connection with the weirs. Fig. 6 is a perspective view of one of the clips employed for holding the weirs and their detachable plugs in position on the bases of the rails. Figs. 7 and 8 are end views of rails, showing modified steps in the process. Fig. 9 is a similar view, illustrating still another modification in the process; and Fig. 10 is a similar view, illustrating by dotted lines the movement of the splice bar or bonding piece when forced into contact with the bases of the rails.

Like numerals of reference, refer to corresponding parts throughout the different views of the drawings.

The reference numerals 12 and 13 designate two railway rails to be joined, but which may be metallic pieces used for other purposes, and which have their ends abutted or closely approximated. Placed beneath the adjacent or meeting portions of the rails or pieces 12 and 13 is a splice bar or bonding piece 14, which is channel-shaped or rather forms, in cross-section, three sides of a rectangular figure, and may be made of any suitable metal and desired length or size. This channel bar or bonding piece is normally supported at a distance below the bases 15 of the rails or pieces 12 and 13 by means of weirs and clips, which are located on the bases 15 of the rails at each end of the bar or piece 14, and the sides of said bar are of sufficient height to extend above the bases of the rails, and are also located at a sufficient distance apart to permit of or produce a space between one or both of the side edges of the bases and the sides of the bar 14, in order that flux or other material may be placed between the bases 15 and bottom or horizontal portion of the splice bar or bonding piece.

Each of the weirs at the ends of the splice bar or bonding piece 14, which, for brevity, will hereinafter be termed channel bar, consists of a block 16 of non-electric conducting material, such as clay, or the like, and has at each of its ends an upward extension 17 to rest against the edges of the bases 15 of the rails, for it will be understood that the weirs 16 are located across the bottom of the bases 15, as shown in Figs. 1 and 3 of the drawings, and each is provided on its inner lower surface with a ledge 18 on which the ends of the channel bar 14 will rest when in its normal position. Each of the weirs or blocks 16 is held in place on the bases of the rails by means of a clip 19, which has on its lower outer portion an upwardly extending flange 20 to rest against the outer surface of the weir 16 so as to prevent movement thereof longitudinally on the rail to which it is applied. By reference to Figs. 1, 3, 4 and 6 of the drawings, it will be seen and understood that the flanges 20 on the clips 19 are of less depth than the blocks or weirs 16, so that said flanges will not touch or be in contact with the bases of the rails. Each of the clips 19 is provided at each of its ends with an inturned apertured portion 21 which, when in position on the rail, will project over the sides of the base thereof and at some distance thereabove. As the upper surfaces of the sides of the bases of the rails are usually outwardly and downwardly inclined or beveled, a beveled block 22, having a transverse slot 23, is employed, to fill in the space between the upper surface of each side of the base of the rail and the inturned portion 21 of the clip, for the purpose of preventing the overflow of the material held by the channel bar, at its ends. The clips 19 are secured in place on the rails by means of screws 24, which are passed through the apertures in the extensions 21, and through the slots 23 of the blocks 22, which constitute parts of the weirs.

As the weirs are located at each end of the channel bar 14, which, as before explained, normally rests at its ends on the ledges 18 of the weirs and at a distance below the bases 15 of the rails, as will be understood by reference to Figs. 2, 7 and 8 of the drawings, it is apparent that a receptacle will be formed around the lower portion of the rails or pieces to be joined, in which suitable flux 25 in molten condition may be poured, so as to lie between the bases 15 of the rails and the sides and bottom of the channel bar 14 or bonding piece. Located beneath and on the sides of the channel bar 14 is a platen 26, the upper surface of which is flat, and is preferably of sufficient length to extend from one of the flanges 18 on one of the weirs 16 to the other flange on the other weir. In other words, the platen is slightly shorter than the channel bar 14, as is clearly shown in Fig. 3 of the drawings. At about its middle, the platen 26 has on each of its sides an upward extension 27, which lie closely against the outer surface of the sides of the channel bar 14, and each of the extensions 27 is provided with apertured bosses 28, in which are located screws 29 which are used to force the channel bar 14 downwardly in close contact with the platen 26 and to hold the same in such a position. Secured to the platen 26, and usually to one of the extensions 27 thereof by means of a binding post 30, is an electric conductor 31, which leads from a source of electric supply (not shown). Located on the top of the rails or pieces 12 and 13 to be joined, and across their joint, is another platen or plate 32, which has connected thereto by means of a binding post 33 an electric conductor 34, which also leads to a source of electric supply.

When the parts are in the positions shown by continuous lines in Fig. 2 of the drawings, it is apparent that a clamping device, of any suitable kind, may be employed for forcing the channel bar 14 or bonding piece up against the bottom of the bases 15 of the rails, but in the present instance I have shown such a device consisting of an upright body portion 35, having at its upper and lower ends lateral extensions or arms 36 and 37, respectively, the former of which is adapted to project over the plate 32 on the top of the rails, and the latter to extend under and against the platen 26 about midway of its length. The upper arm 36 of the clamping device is apertured near its free end, and has located therein a shaft 38 which carries heads 39 and 40 on its upper and lower ends, respectively. The head 40 is provided on its lower surface with insulating material 41, and the shaft 38 has a spring 42 surrounding the same, to normally hold the heads 39 and 40 in raised positions. The arm 36 has near its free end two spaced apart and upwardly extending projections 43, between and on which is fulcrumed a cam-lever 44, the cam portion of which is adapted to impinge against the head 39 of the clamping device. Mounted on a suitable support or bracket 45 on the body portion 35 of the clamping device is a power cylinder 46, preferably hydraulic and of any well-known construction, to one end of the piston rod 47 of which is pivotally connected one end of the cam-lever 44, as is clearly shown in Figs. 1 and 2 of the drawings.

By again referring to Fig. 2 of the drawings it will be understood that when the parts are in the positions shown by full lines in said figure, a quantity of flux 25, of any suitable kind, is poured in a molten state into the space between the channel bar 14 and the bases of the rails, when by turning on the current through the conductors 31 and 34 and through the platens 26 and 32 and channel bar 14, it is apparent that by reason of the conductivity of the flux contained in the space between the channel bar and the rails, the latter, as well as the channel bar, will become heated to a welding degree, when by forcing the platen 26 and channel bar 14, which may be done through the instrumentality of the power cylinder 46, cam-lever 44 and clamping device 35, or otherwise, up against the bases of the rails, they will be effectually welded or joined together. In the operation of forcing the channel bar 14 or bonding piece toward the base of the rails or pieces to be joined, it is apparent that the weirs 16 at the ends of the channel bar will be undisturbed or left unbroken, thus avoiding the possibility of any portions thereof becoming lodged between the channel bar and bases of the rails.

In some instances I may displace the molten flux after the rails and channel bar have become sufficiently heated, by means of molten metal 48, of a higher specific gravity than the flux, which is poured into the space between the channel bar 14 and the bases 15 of the rails, as shown in Fig. 7, after which the channel bar containing the molten metal may be forced upwardly toward the bottom of the rail pieces by means of the clamping devices above-described, or otherwise.

I may sometimes employ a quantity of comminuted metal 49, of any suitable kind, together with the flux 25, by placing the same in the space between the channel bar 14 and the bases of the rails, as shown in Fig. 8, in which operation the rails and comminuted metal, as well as the channel bar, will be heated to the desired degree through the agency of the flux and the electric current, in a similar manner as above-described, when the channel bar may be forced upwardly toward the bases of the rails by any suitable means, thus uniting the parts.

Instead of using the platen 26, as above-described, I may sometimes omit the same and connect an electric conductor 50 directly to the channel bar 14, as shown in Fig. 9 of the drawings, when either the flux, the molten metal and flux, or the comminuted metal and flux, may be placed in the space between the channel bar and the bases of the rails, and the parts heated and the channel bar pressed upwardly as before explained. In Fig. 9 I have shown still another modification in my process, which I may sometimes employ, and which consists in placing in the channel bar a solid piece of metal 51, and on the top of the same a quantity of flux 25 in molten condition, when by turning on the current through the conductors 50 and 34, it is evident that the piece of metal 51 and the bases of the rails will become heated to the desired degree, when the channel bar may be forced upwardly so as to bring the metal piece 51 into contact with the bases of the rails and effectually unite the same.

In the foregoing description and explanation I have set forth the process as being used for joining railway rails, and have shown in the drawings such rails in the act of being joined, but it is obvious that my invention is applicable for use in joining two or more metallic pieces, to be used for any desired purpose, and for this reason I do not desire to be understood as limiting my process to the joining of rails, in which operation there are at least three pieces, that is, the two rails and the bonding piece. It is evident that one of these pieces may be omitted, and it is also manifest that instead of moving the bonding piece upwardly against the rail or rails, the latter can be moved toward the bonding piece, or both the bonding piece and rail or rails may be moved so as to be brought into contact with one another. When the flux only is used between the two pieces to be joined together, it is evident that when said pieces are brought toward each other, the flux, being in a molten state, will be displaced by such operation. When molten metal is poured into the space between the two pieces to be joined, it will be understood that the flux being of lower specific gravity than the molten metal will be displaced thereby and that the said space may be entirely filled with the molten metal, thus obviating the necessity of bringing the two pieces toward each other, or a smaller quantity of the molten metal may be employed and the pieces moved toward each other. When either the comminuted metal and flux or the solid piece of metal 51 is employed, the flux may be displaced by the movement toward each other of the pieces to be joined.

Having thus fully described my invention, what I claim as new, and desire to secure by Letters-Patent, is—

1. The herein described process of uniting rails and other metallic pieces, which consists in supporting a splice bar or bonding piece at a distance from and below the bases of the rails or metal pieces and across their joint, then applying molten flux between the splice bar or bonding piece and the rails or metal pieces to be joined, then heating the splice bar or bond piece and the rails or metal piece or pieces to be joined through the agency of the flux and by means of an electric current, and then forcing the splice bar or bond piece into contact with the rails or metal piece or pieces.

2. The herein described process of uniting rails and other metallic pieces, which consists in supporting a bar or piece at a distance from the bases of the rails or metal piece or pieces, applying molten flux and metal between the bar or piece and the rails or metal piece or pieces to be joined, then heating the bar, metal, and the rails or metal piece or pieces to be joined through the agency of the flux and by means of an electric current, and then forcing the bar and metal piece or pieces toward each other.

3. The herein described process of uniting rails and other metallic pieces, which consists in supporting a splice bar or bonding piece at a distance from the bases of the rails or metal pieces and across their joint, applying molten flux and metal between the splice bar or bonding piece and the rails or metal pieces to be joined, then heating the splice bar or bond piece, metal and the rails or metal pieces to be joined through the agency of the flux and by means of an electric current, and then forcing the splice bar or bond piece toward the rails or metal pieces and across their joint.

4. The herein described process of uniting rails and other metallic pieces, which consists in supporting a channeled splice bar or bonding piece at a distance from and below the bases of the rails or metal pieces and across their joint and closing the ends of the splice bar or bonding piece, then placing molten flux in the channeled bar and between the same and the rails or metal pieces to be joined, then heating the splice bar or bond piece and the rails or metal pieces to be joined through the agency of the flux and by means of an electric current, and then forcing the splice bar or bond piece into contact with the rails or metal pieces across their joint.

5. The herein described process of uniting rails and other metallic pieces, which consists in movably supporting a channeled splice bar or bonding piece with its ends closed and at a distance from the bases of the rails or metal pieces and across their joint, then applying molten flux between the splice bar or bonding piece and the rails or metal pieces to be joined, then heating the splice bar or bond piece and the rails or metal pieces to be joined through the agency of the flux and by means of an electric current, and then forcing the splice bar or bond piece into contact with the rails or metal pieces across their joint.

6. The herein described process of uniting rails and other metallic pieces, which consists in locating a channeled splice bar or bonding piece at a distance from and below the bases of the rails or metal pieces and across their joint, movably supporting and closing the ends of the splice bar or bonding piece on the rails or metal pieces by means of clips and weirs, then applying molten flux between the splice bar or bonding piece and the rails or metal pieces to be joined, then heating the splice bar or bond piece and the rails or metal pieces to be joined through the agency of the flux and by means of an electric current, and then forcing the splice bar or bond piece into contact with the rails or metal pieces across their joint.

CHARLES F. JACOBS.

Witnesses:
CHAS. C. TILLMAN,
M. A. NYMAN.